United States Patent
Kim et al.

(10) Patent No.: US 9,945,512 B2
(45) Date of Patent: Apr. 17, 2018

(54) STRUCTURE FOR MOUNTING ENGINE MOUNT

(71) Applicants: Hyundai Motor Company, Seoul (KR); Pyung Hwa Industrial Co., Ltd., Daegu (KR)

(72) Inventors: Hyo-Seok Kim, Gwangmyeong-si (KR); Yong-Jin Kim, Gwangmyeong-si (KR); Jong-Su Park, Daegu (KR); Do-Hun Kim, Daegu (KR); Myung-Han Kim, Daegu (KR)

(73) Assignees: Hyundai Motor Company, Seoul (KR); Pyung Hwa Industrial Co., Ltd., Daegu (KR)

( * ) Notice: Subject to any disclaimer, the term of this patent is extended or adjusted under 35 U.S.C. 154(b) by 0 days.

(21) Appl. No.: 15/356,410

(22) Filed: Nov. 18, 2016

(65) Prior Publication Data
US 2018/0073674 A1 Mar. 15, 2018

(30) Foreign Application Priority Data

Sep. 9, 2016 (KR) .......................... 10-2016-0116192

(51) Int. Cl.
*F16M 13/02* (2006.01)
*B60K 5/12* (2006.01)
*F16F 15/08* (2006.01)

(52) U.S. Cl.
CPC ........... *F16M 13/02* (2013.01); *B60K 5/1208* (2013.01); *F16F 15/08* (2013.01)

(58) Field of Classification Search
CPC ........ F16M 13/02; B60K 5/1208; F16F 15/08
USPC ................................ 248/635, 568, 580, 609
See application file for complete search history.

(56) References Cited

U.S. PATENT DOCUMENTS

| | | | | |
|---|---|---|---|---|
| 3,350,042 A * | 10/1967 | Stewart | ................. | F16F 1/3732 267/141.4 |
| 3,532,319 A * | 10/1970 | Brown | ................. | F16F 1/3732 267/141.4 |
| 5,842,677 A * | 12/1998 | Sweeney | ............... | F16F 1/3863 248/56 |
| 6,062,763 A * | 5/2000 | Sirois | ..................... | B62D 27/04 248/635 |
| 9,027,912 B2 * | 5/2015 | Hibi | ........................ | F16F 15/08 248/635 |

FOREIGN PATENT DOCUMENTS

KR 10-1687694 B1 1/2017

* cited by examiner

*Primary Examiner* — Anita M King
(74) *Attorney, Agent, or Firm* — Morgan, Lewis & Bockius LLP

(57) ABSTRACT

A structure for mounting an engine mount, may include bracket which is coupled to the engine mount, and may have at least one mounting hole; an insulator which may have a pipe shape having a center hole, includes a material having elasticity, and is fitted into the at least one mounting hole; and a fixing pipe which is fitted into the center hole, and mounted in the at least one mounting hole together with the insulator, in which a recessed portion having a partially cut out shape or a recessed shape is formed along a circumference of the insulator at a first side of the insulator.

2 Claims, 4 Drawing Sheets

< STRUCTURE OF RELATED ART >

< STRUCTURE OF PRESENT INVENTION >

STRUCTURE FOR MOUNTING ENGINE MOUNT

CROSS-REFERENCE TO RELATED APPLICATIONS

The present application claims priority to Korean Patent Application No. Korean Patent Application No. 10-2016-0116192, filed on Sep. 9, 2016, the entire contents of which is incorporated herein for all purposes by this reference.

BACKGROUND OF THE INVENTION

Field of the Invention

The present invention relates to a structure for mounting an engine mount which is mounted on a vehicle body to support a load of an engine and insulate the engine from vibration, and more particularly, to a structure for mounting an engine mount which may be easily assembled (may reduce a magnitude of press-fitting force required for assembly and may be manufactured as one piece without manufacturing a separate insulator), and may improve dynamic characteristics by absorbing the deformation amount of an insulator generated after the engine mount is mounted in a press-fit manner, thereby improving vibration insulation performance.

Description of Related Art

Vibration is always generated in an engine of a vehicle because of the structure of the engine, and the vibration is also transmitted to the engine due to an uneven ground surface when the vehicle travels. The vibration is not generated only by a single cause, but by multiple complex causes, and the vibration is generated in all up and down, left and right, and front and rear directions.

The engine of the vehicle is not installed separately from a vehicle body, but is also connected with a transmission, an air conditioner, and the like, and as a result, the vibration generated by the engine has an effect on the entire vehicle.

Therefore, in order to attenuate the vibration generated by the engine, the engine is mounted on the vehicle body by means of an engine mount, and the engine mount is also mounted on the vehicle body by means of separate brackets, bolts, and nuts.

An engine mount 1 is fixed to a vehicle body (not illustrated) by being coupled to a bracket 2 as illustrated in FIG. 1, the bracket 2 has a shape such that the engine mount 1 may be fixed to the bracket 2 by being fitted with the center of the bracket 2, and holes are formed in a portion extending in a width direction so that the bracket 2 may be fixed to the vehicle body by means of bolts 7 and nuts 6.

The bracket 2 may be mounted directly on the vehicle body by means of the bolts 7 and the nuts 6, and in some instances, the bracket 2 may be mounted together with an insulator (3: 3a and 3b) for the purpose of additional vibration insulation. That is, as illustrated in FIG. 1, the insulators 3 and fixing pipes 5 are coupled and mounted to the holes of the bracket 2 which are penetrated by the bolts 7 together with the vehicle body.

The insulator 3 includes a material having elasticity and serves to additionally attenuate vibration which is transmitted to the vehicle body through the bolts 7, and the fixing pipe 5 supports the insulator 3 and the bolt 7 so as to prevent damage to the insulator 3.

Meanwhile, in the case of the structure in the related art, the insulator 3 is manufactured in a pipe shape sized to be inserted into the hole in the bracket 2 in order to fix the insulator 3 into the hole in the bracket 2 as illustrated, and the insulator 3 is manufactured to have two portions 3a and 3b which are separately manufactured (the two portions 3a and 3b are fitted with upper and lower portions of the hole in the bracket 2, respectively), and an assembly process is carried out such that the two portions 3a and 3b are inserted into the hole, and then the fixing pipe 5 is inserted into a hole 4 of the insulator 3 (alternatively, an assembly process is carried out such that the fixing pipe 5 is inserted in advance into the insulator, and in this state, the insulator 3 is mounted into the hole in the bracket 2).

However, in the case of the aforementioned assembly method, (since the insulator is divided into the two portions) there are problems in that the number of components is increased, time required for assembly is increased, an assembly process is carried out in a state in which the insulator 3 is excessively pressed by the fixing pipe 5 due to tolerance when the fixing pipe 5 is press-fitted, and an assembly process is carried out with press-fitting force lower than reference press-fitting force.

To solve the aforementioned problems, there has been proposed a method of manufacturing the insulator formed integrally with the fixing pipe 5 by injection-molding rubber between the fixing pipe 5 and the hole in the bracket 2 in a state in which the fixing pipe 5 is inserted into the hole in the bracket 2, but in this case, there are problems in that the time required for the injection molding is increased even though the time required for assembly is decreased, and a surface treatment is degraded.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a structure for mounting the mount, which may be manufactured as one piece without manufacturing a separate insulator unlike a structure in the related art, may reduce a magnitude of press-fitting force required to insert an insulator, and may improve dynamic characteristics by minimizing deformation of the insulator due to insertion of a fixing pipe.

Various aspects of the present invention are directed to providing a structure for mounting an engine mount, the structure including: a bracket which is coupled to the engine mount, and may have at least one mounting hole; an insulator which may have a pipe shape having a center hole, includes a material having elasticity, and is fitted into the at least one mounting hole; and a fixing pipe which is fitted into the center hole, and mounted in the at least one mounting hole together with the insulator, in which a recessed portion having a partially cut out shape or a recessed shape (e.g., a 'V' shape or a 'U' shape) is formed along a circumference of the insulator at a first side of the insulator.

At least two recessed portions may be formed along the circumference of the insulator at positions spaced apart from each other, a catching portion, which protrudes in a longitudinal direction further than the recessed portion, may be formed between the adjacent recessed portions, and the catching portion may be formed to have a shape bent in a direction in which a diameter of the insulator is increased.

An outer diameter defined by the bent portions of the catching portions may be greater than a diameter of the at least one mounting hole.

A bottom surface of each of the bent portions of the catching portions, which comes into direct contact with the bracket, may be formed as a flat shape, and an upper surface of each of the bent portions of the catching portions is formed as an inclined surface, such that the bent portion may have a shape (a wedge shape) that becomes narrower toward an end of the bent portion.

According to an exemplary embodiment of the present invention having the aforementioned configurations, since the recessed portions are formed in the insulator, the elastic deformation amount is absorbed in a case in which the insulator is elastically deformed when the insulator is inserted into the at least one mounting hole and when the fixing pipe is fitted into the center hole, and as a result, it is possible to prevent damage to the insulator and improve durability.

Since the recessed portions are formed along the circumference of the insulator, the elastic deformation amount may be efficiently dispersed and absorbed, and in an exemplary embodiment of the present invention, since the surface of the catching portion of the insulator, which comes into direct contact with the at least one mounting hole when the insulator enters the at least one mounting hole, is formed as an inclined surface (formed in a wedge shape), the insulator may easily enter the at least one mounting hole and may be positively inhibited from being withdrawn from the at least one mounting hole.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
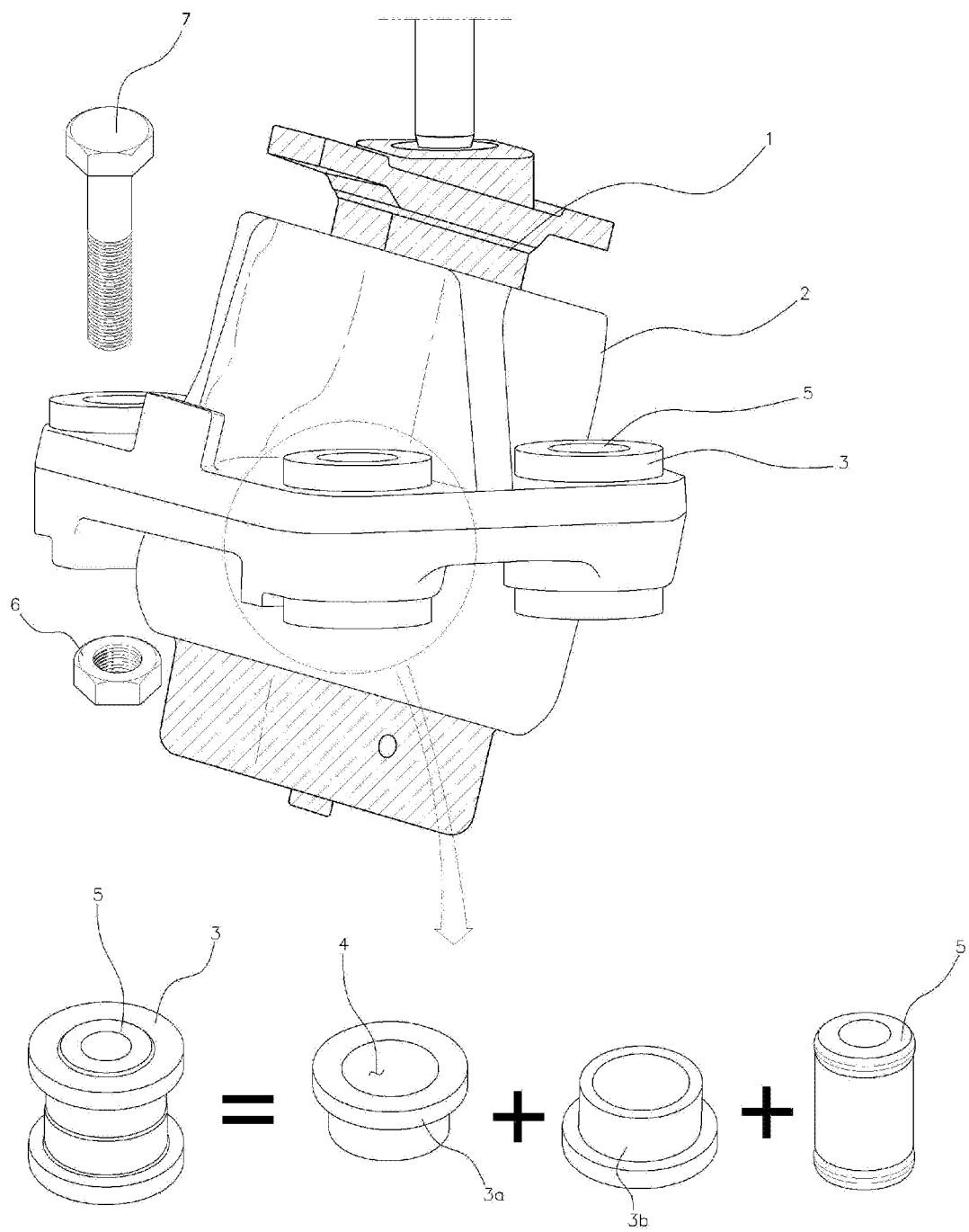
FIG. 1 is a view illustrating a bracket in the related art to which an engine mount is coupled, and a state in which an insulator and a fixing pipe to be mounted to the bracket are disassembled.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A part irrelevant to the description will be omitted to clearly describe the present invention, and the same or similar constituent elements will be designated by the same reference numerals throughout the specification.

Terms or words used in the specification and the claims should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method.

Various embodiments of the present invention relates to a structure for mounting an engine mount on a vehicle body, and hereinafter, an exemplary embodiment of the present invention will be described in more detail with reference to the drawings.

Figure 2:
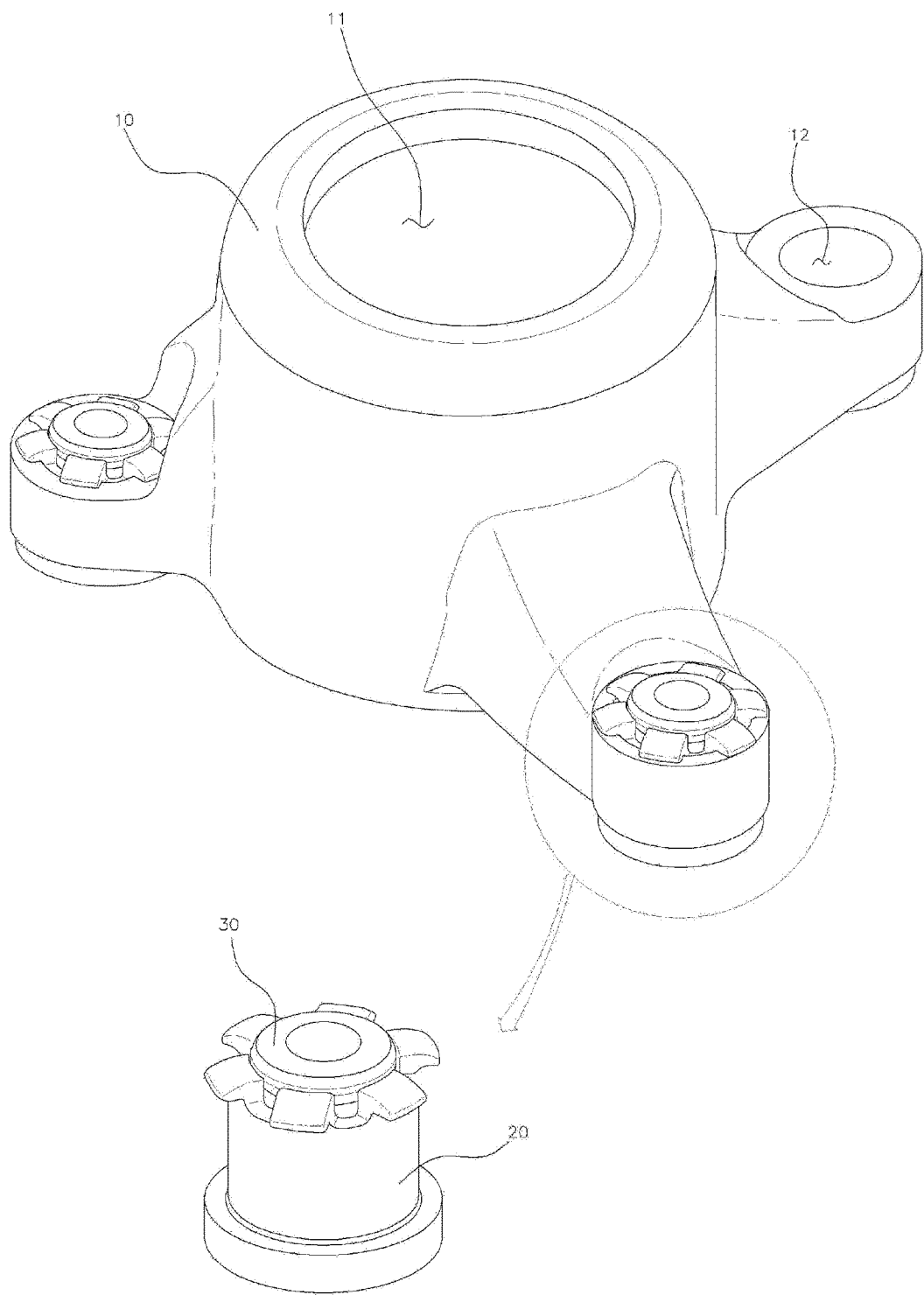
FIG. 2 is a view illustrating a state in which an insulator and a fixing pipe are mounted to a bracket according to an exemplary embodiment of the present invention.

As illustrated in FIG. 2, the present invention includes a bracket 10, insulators 20, and fixing pipes 30. Like the structure in the related art, the bracket 10 has an opening 11 to which an engine mount may be coupled, and has a structure in which at least one mounting hole 12, into which bolts for fixing the bracket to the vehicle body may be inserted, are formed in a portion extending in a width direction.

The insulator 20 has a pipe shape having a center hole 21 opened in a longitudinal direction, includes a material having elasticity, and is fitted with the at least one mounting hole 12. Further, the fixing pipe 30 has a hole 31 into which the bolt is inserted, and is fitted with the center hole 21 and then mounted in the at least one mounting hole 12 together with the insulator 20.

In an exemplary embodiment of the present invention, recessed portions 22 each having a partially cut out shape or a recessed shape (e.g., a 'V' shape or a 'U' shape) are formed along a circumference of the insulator 20 at a first side of the insulator 20 to provide spaces configured for receiving the deformation amount when inserting the insulator into the at least one mounting hole and/or when inserting the fixing pipe into the center hole.

In the exemplary embodiment of the present invention, at least two recessed portions 22 are formed along the circumference of the insulator 20 at positions spaced apart from each other, and catching portions 23, which protrude in a longitudinal direction further than the recessed portions 22, that is, protrude to make concave-convex shapes, are formed between the adjacent recessed portions 22.

The catching portion 23 is formed to have a shape bent in a direction in which a diameter of the insulator 20 is increased, such that an outer diameter defined by the bent portions of the catching portions 23 is greater than an inner diameter of the at least one mounting hole 12. Therefore, when the insulator 20 is inserted into the at least one mounting hole 12 and then elastically restored, the catching portions 23 serve to support the insulator 20 so that the insulator 20 is not withdrawn downward.

Each of the bent portions of the catching portions 23 may have an inclined upper surface, such that the bent portion may have a wedge shape that becomes narrower toward an end of the bent portion. Therefore, an area with which the catching portions 23 contact when the catching portions 23 enter the at least one mounting hole 12 is decreased, and as a result, the insulator 20 may enter the at least one mounting hole 12 with lower press-fitting force.

Figure 3:
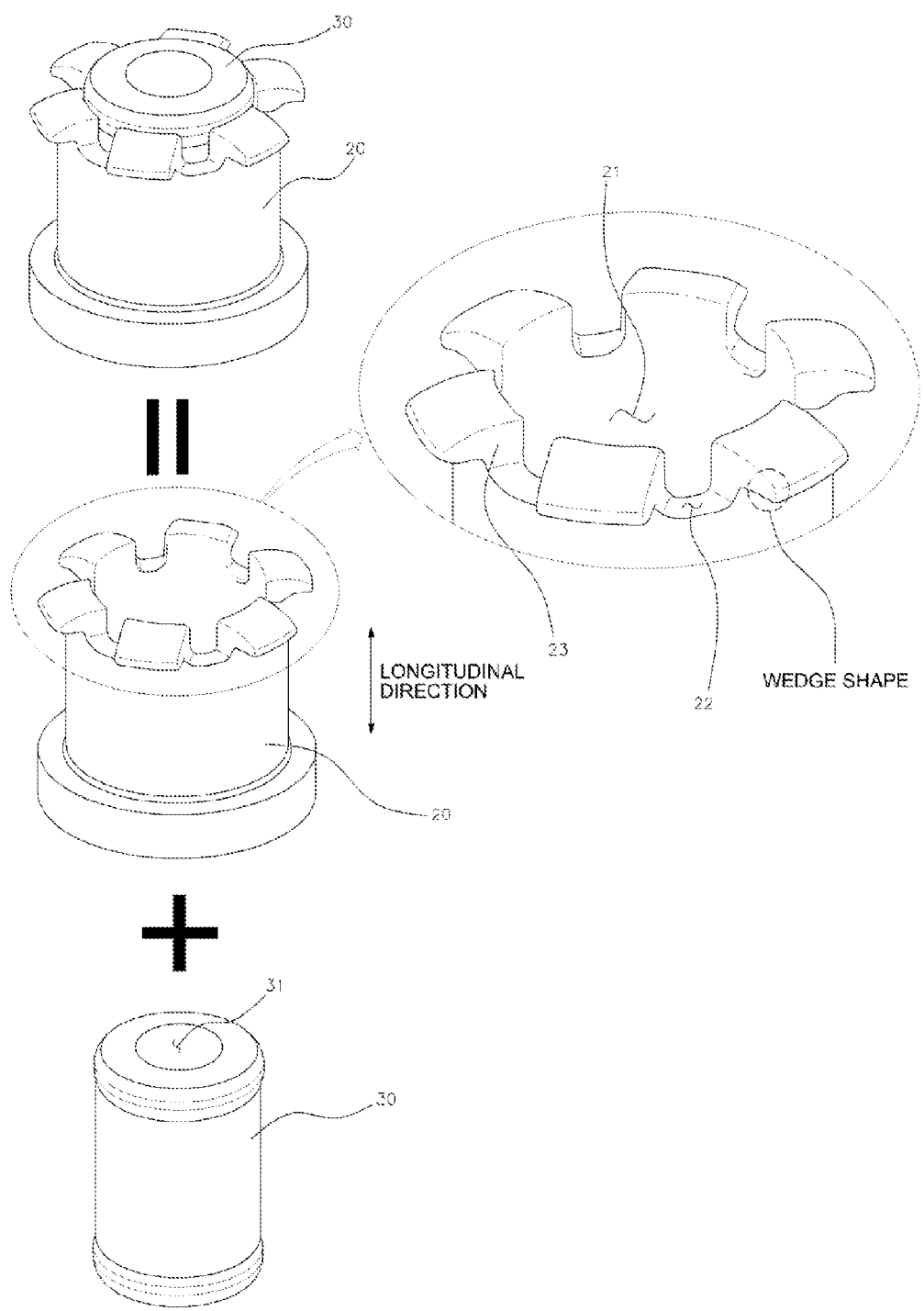
FIG. 3 is a view illustrating a state in which the insulator and the fixing pipe according to the exemplary embodiment of the present invention are disassembled.

For reference, FIG. 2 and FIG. 3 illustrate that the recessed portions 22 and the catching portions 23 are formed at an upper end of the insulator 20, but the recessed portions 22 and the catching portions 23 may be selectively formed at one or both of the upper and lower ends of the insulator 20 in accordance with a shape of the bracket and a structure in which the engine mount is positioned.

According to an exemplary embodiment of the present invention having the aforementioned configurations, since the recessed portions 22 are formed in the insulator 20, the elastic deformation amount is absorbed in a case in which the insulator 20 is elastically deformed when the insulator 20 is inserted into the at least one mounting hole 12 and when the fixing pipe 30 is fitted into the center hole 21, and as a result, it is possible to prevent damage to the insulator 20 and improve durability.

Figure 4:
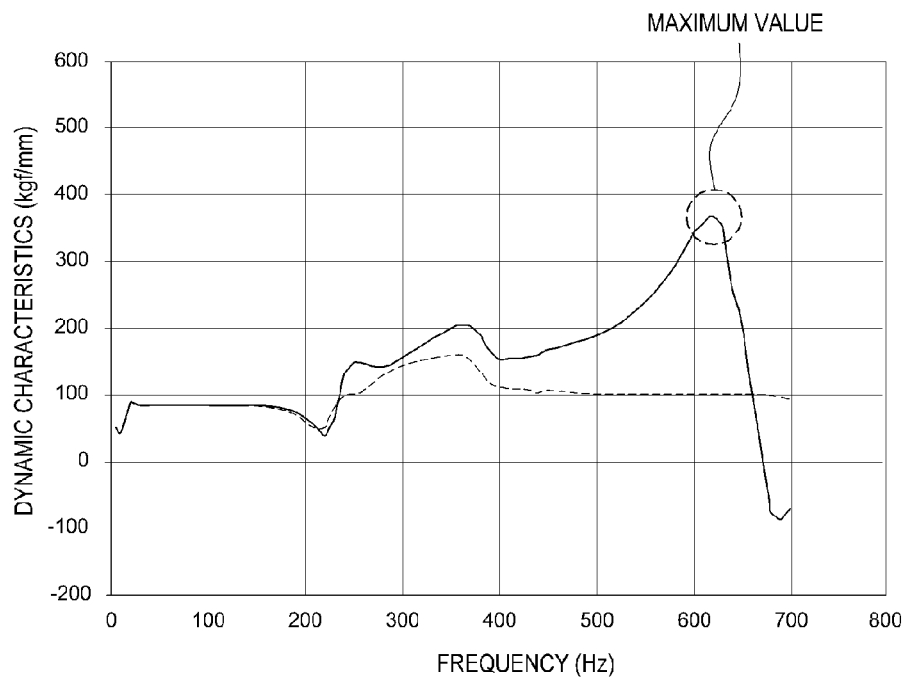
FIG. 4 is a view illustrating graphs for comparing dynamic characteristics of the insulator in the structure in the related art with dynamic characteristics of the insulator in the structure of the present invention.
Figure 4:
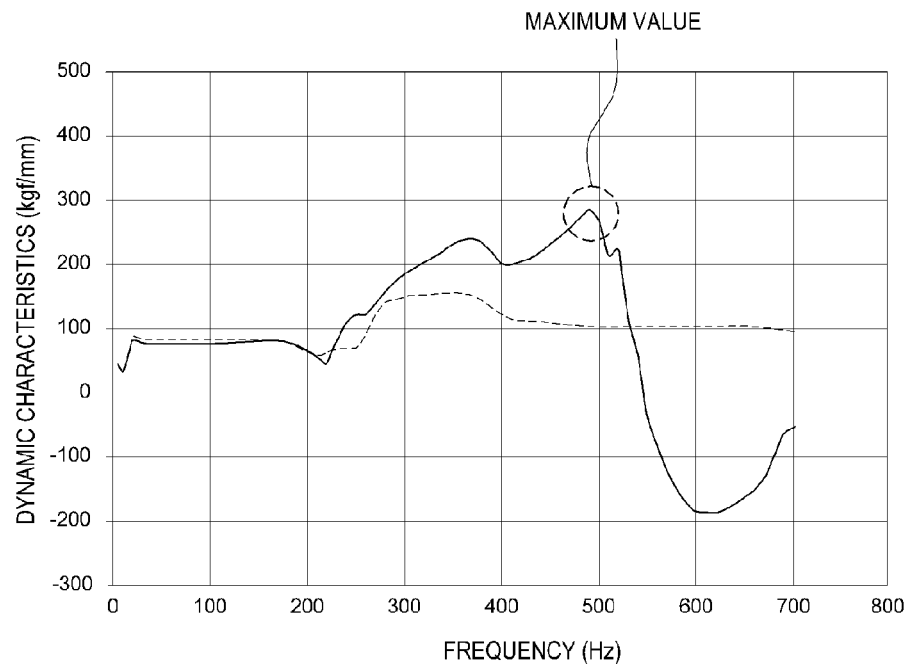

That is, referring to the graphs in FIG. 4, in an exemplary embodiment of the present invention, the deformation amount of the insulator 20 is absorbed by the recessed portions 22, and as a result, values of dynamic characteristics including a maximum value are decreased overall by approximately 15% to 20% in comparison with the structure in the related art (a range within which the insulator may be elastically deformed is increased). Therefore, insulation performance against inputted vibration is improved, and noise, vibration, and harshness (NVH) performance may be improved.

Since the recessed portions 22 are formed along the circumference of the insulator 20, the elastic deformation amount may be efficiently dispersed and absorbed, and in an exemplary embodiment of the present invention, since the surface of the catching portion 23 of the insulator 20, which comes into direct contact with the at least one mounting hole 12 when the insulator 20 enters the at least one mounting hole 12, is formed as an inclined surface, the insulator 20 may enter the at least one mounting hole 12 and may be positively inhibited from being withdrawn from the at least one mounting hole 12.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure for mounting an engine mount, the structure comprising:
   a bracket which is coupled to the engine mount, and has at least one mounting hole;
   an insulator which has a pipe shape having a center hole, includes a material having elasticity, and is fitted into the at least one mounting hole; and
   a fixing pipe fitted into the center hole, and mounted in the at least one mounting hole together with the insulator,
   wherein a recessed portion having a partially cut out shape or a recessed shape is formed along a circumference of the insulator at a side of the insulator,
   wherein at least two recessed portions are formed along the circumference of the insulator at positions spaced apart from each other,
   wherein a catching portion, which protrudes in a longitudinal direction further than the recessed portion, is formed between adjacent recessed portions and the catching portion is formed to have a shape bent in a direction in which a diameter of the insulator is increased, and
   wherein each of the bent portions of the catching portions has an inclined upper surface, such that the bent portion has a wedge shape that becomes narrower toward an end of the bent portion.

2. The structure of claim 1, wherein an outer diameter defined by bent portions of the catching portions is greater than a diameter of the at least one mounting hole.

* * * * *